US008842546B2

United States Patent
Chen et al.

(10) Patent No.: US 8,842,546 B2
(45) Date of Patent: Sep. 23, 2014

(54) METHOD FOR WIRELESS COMMUNICATION IN A DEVICE WITH CO-EXISTENCE RADIO

(75) Inventors: Yih-Shen Chen, Hsinchu (TW);
Chia-Chun Hsu, Taipei (TW); William Plumb, Charlestown, MA (US); Michael Roberts, Neuilly sur Seine (FR)

(73) Assignee: Mediatek Inc. (TW)

( * ) Notice: Subject to any disclaimer, the term of this patent is extended or adjusted under 35 U.S.C. 154(b) by 378 days.

(21) Appl. No.: 13/135,844

(22) Filed: Jul. 15, 2011

(65) Prior Publication Data

US 2012/0020231 A1    Jan. 26, 2012

Related U.S. Application Data

(60) Provisional application No. 61/366,819, filed on Jul. 22, 2010, provisional application No. 61/390,531, filed on Oct. 6, 2010.

(51) Int. Cl.
| | |
|---|---|
| *H04B 7/00* | (2006.01) |
| *H04W 36/08* | (2009.01) |
| *H04W 88/06* | (2009.01) |
| *H04W 28/18* | (2009.01) |
| *H04W 48/20* | (2009.01) |
| *H04W 84/18* | (2009.01) |
| *H04W 28/04* | (2009.01) |
| *H04W 24/00* | (2009.01) |

(52) U.S. Cl.
CPC .............. *H04W 36/08* (2013.01); *H04W 88/06* (2013.01); *H04W 28/18* (2013.01); *H04W 48/20* (2013.01); *H04W 84/18* (2013.01); *H04W 28/04* (2013.01); *H04W 24/00* (2013.01)
USPC .......................................... 370/241; 370/310

(58) Field of Classification Search
None
See application file for complete search history.

(56) References Cited

U.S. PATENT DOCUMENTS

2006/0281466 A1*  12/2006  Gholmieh et al. ............ 455/450
2007/0224936 A1    9/2007  Desai et al. .................. 455/41.2

(Continued)

FOREIGN PATENT DOCUMENTS

| JP | 2009177762 | 8/2009 |
| JP | 2010081447 | 4/2010 |

(Continued)

OTHER PUBLICATIONS

International Search Report and Written Opinion of International Search Authority for PCT/CN2011/077444 dated Oct. 27, 2011 (10 pages).

(Continued)

*Primary Examiner* — Kevin C Harper
(74) *Attorney, Agent, or Firm* — Zheng Jin

(57) ABSTRACT

Various methods for wireless communication in a device with co-existed/co-located radios are provided. Multiple communication radio transceivers are co-existed/co-located in a user equipment (UE) having in-device coexistence (IDC) capability, which may result in IDC interference. For example, the UE is equipped with both LTE radio and some ISM band applications such as WiFi and Bluetooth modules. In a first method, the network identifies IDC capability by UE identification (e.g., UE ID). In a second method, the UE intentionally performs cell selection or reselection to cells in non-ISM frequency bands. In a third method, the UE signals the existence of ISM band applications via capability negotiation. In a fourth method, the UE signals the activation of ISM band applications by signaling messages (e.g., RRC message or MAC CE). Under the various methods, the UE and its serving eNB can apply FDM or TDM solutions to mitigate the IDC interference.

20 Claims, 6 Drawing Sheets

(56) References Cited

U.S. PATENT DOCUMENTS

| | | | |
|---|---|---|---|
| 2008/0205365 A1 | 8/2008 | Russell et al. | 370/341 |
| 2009/0213773 A1 | 8/2009 | Yoon et al. | 370/311 |
| 2009/0323652 A1 | 12/2009 | Chen et al. | 370/338 |
| 2010/0061326 A1 | 3/2010 | Lee et al. | 370/329 |
| 2010/0189044 A1* | 7/2010 | Roy et al. | 370/328 |
| 2011/0134882 A1 | 6/2011 | Aoyama et al. | 370/331 |
| 2011/0230185 A1 | 9/2011 | Tanaka et al. | 455/425 |
| 2011/0242969 A1* | 10/2011 | Dayal et al. | 370/225 |
| 2011/0243094 A1* | 10/2011 | Dayal et al. | 370/331 |
| 2013/0252605 A1* | 9/2013 | Lee et al. | 455/422.1 |

FOREIGN PATENT DOCUMENTS

| | | |
|---|---|---|
| JP | 2011514048 | 4/2011 |
| JP | 2011530251 | 12/2011 |
| WO | WO2009107969 A2 | 9/2009 |
| WO | WO2009107969 A3 | 11/2009 |
| WO | WO2010025678 | 3/2010 |

OTHER PUBLICATIONS

Office Action for the Japanese patent application JP 2013-519949 dated Dec. 24, 2013 (4 pages).

Taiwan IPO, Office Action for TW patent application 100125922 dated Mar. 20, 2014 (7 pages).

3GPP TS 36.423 V9.3.0 (Jun. 2010), 3rd Generation Partnership Project; Technical Specification Group Radio Access Network; Evolved Universal Terrestrial Radio Access Network (E-UTRAN); X2 application protocol (X2AP) (Release 9).

* cited by examiner

```
RRCConnectionReestablishmentRequest ::= SEQUENCE {
    criticalExtenstions         CHOICE {
        rrcConnectionReestablishmentRequest-r8
                                RRCConnectionReestablishmentRequest-r8-IEs,
        criticalExtensionFuture SEQUENCE { }
    }
}

RRCConnectionReestablishmentRequest-r8-Ies ::= SEQUENCE {
    UE-Identity            ReestabUE-Identity,
    reestablishmentCause   ReestablishmentCause,
    spare                  BIT STRING (SIZE (2))
}

ReestabUE-Idendity ::= SEQUENCE {
    c-RNTI         C-RNTI,
    physCellId     PhyCellId,
    shortMAC-I     shortMAC-I
}

ReestablishmentCause ::= ENUMERATED {
    reconfigurationFailure, handoverFailure, otherFailure, IDCFailure}
```

FIG. 10

METHOD FOR WIRELESS COMMUNICATION IN A DEVICE WITH CO-EXISTENCE RADIO

CROSS REFERENCE TO RELATED APPLICATIONS

This application claims priority under 35 U.S.C. §119 from U.S. Provisional Application No. 61/366,819, entitled "Method for wireless communication in a device with co-existence radio," filed on Jul. 22, 2010; U.S. Provisional Application No. 61/390,531, entitled "RRM Solutions for In-Device Coexistence," filed on Oct. 6, 2010, the subject matter of which is incorporated herein by reference.

TECHNICAL FIELD

The disclosed embodiments relate generally to wireless network communications, and, more particularly, to wireless communication in a device with co-existence radio interfaces.

BACKGROUND

Ubiquitous network access has been almost realized today. From network infrastructure point of view, different networks belong to different layers (e.g., distribution layer, cellular layer, hot spot layer, personal network layer, and fixed/wired layer) that provide different levels of coverage and connectivity to users. Because the coverage of a specific network may not be available everywhere, and because different networks may be optimized for different services, it is thus desirable that user devices support multiple radio access networks on the same device platform. As the demand for wireless communication continues to increase, wireless communication devices such as cellular telephones, personal digital assistants (PDAs), smart handheld devices, laptop computers, tablet computers, etc., are increasingly being equipped with multiple radio transceivers. A multiple radio terminal (MRT) may simultaneously include a Long-Term Evolution (LTE) or LTE-Advanced (LTE-A) radio, a Wireless Local Area Network (WLAN, e.g., WiFi) access radio, a Bluetooth (BT) radio, and a Global Navigation Satellite System (GNSS) radio. In the MRT, the LTE-A radio is an Orthogonal Frequency Division Multiple Access-based (OFDMA-based) mobile broadband technology that is capable of providing global roaming services, and the WiFi radio is capable of providing huge bandwidth transmission via local access. The combination of LTE-A and WiFi radio is one of the examples of WiFi offloading, which is a common paradigm of future communications. Multiple radios co-located or coexisted in the same communication device is also referred to as in-device coexistence (IDC).

Due to spectrum regulation, different technologies may operate in overlapping or adjacent radio spectrums. For example, LTE/LTE-A TDD mode often operates at 2.3-2.4 GHz, WiFi often operates at 2.400-2.483.5 GHz, and BT often operates at 2.402-2.480 GHz. Simultaneous operation of multiple radios co-located/coexisted on the same physical device, therefore, can suffer significant degradation including significant coexistence interference (e.g., in-device interference) between them because of the overlapping or adjacent radio spectrums. Due to physical proximity and radio power leakage, when the transmission of data for a first radio transceiver overlaps with the reception of data for a second radio transceiver in time domain, the second radio transceiver reception can suffer due to interference from the transmission of the first radio transceiver. Likewise, data transmission of the second radio transceiver can interfere with data reception of the first radio transceiver.

In LTE/LTE-A systems, there are several available radio resource management (RRM) technologies to mitigate interference. Two radio resource control (RRC) states are defined for LTE UEs. One is RRC_CONNECTED state indicating that a UE is active and the other one is RRC_IDLE state indicating that a UE is idle. In one RRM scheme, when radio link failure (RLF) is declared, a user equipment (UE) may reselect to a cell in another frequency band. Another possible RRM scheme is that the UE may report measurement results (e.g., poor reference signal received power or reference signal received quality (RSRP/RSRQ) of a serving cell) to its serving base station (eNB). Furthermore, for mobility management, if a UE is active (e.g., RRC_CONNECTED state), then the network either refrains from handovering the UE to frequencies/bands with interference or handovering the UE to a cell with better signal measurement. If a UE is idle (e.g., RRC_IDLE state), then the UE avoids camping on frequency/bands with significant interference.

The current Rel-8/9 LTE RRM design, however, does not consider the effect of IDC interference. If an on-going LTE communication is severely affected by IDC, RLF will occur. However, it normally takes one second or longer for a UE to declare RLF, which results in long response time. Another issue is that, under the current RRM design, a UE may handover back to a cell in the original frequency band later, which results in ping-pong effect. In addition, Rel-8/9 backward compatibility should be considered when designing RRM that addresses the IDC interference problem.

SUMMARY

Various methods for wireless communication in a device with co-existing/co-locating radios are provided. Multiple communication radio transceivers are co-existed/co-located in a user equipment (UE) having in-device coexistence (IDC) capability, which may result in coexistence interference. For example, the UE is equipped with both an OFDMA-based radio such as an LTE radio transceiver and some ISM band applications such as WiFi and Bluetooth modules. The WiFi or BT device is also referred to as an ID device that may introduce significant IDC interference because the coexisted/co-located radio transceivers operate in overlapping or adjacent frequency channels. Under the various methods, the UE and its serving eNB can apply FDM or TDM solutions to mitigate the IDC interference.

In a first method, the network identifies IDC capability by UE identification (i.e., UE ID). In one embodiment, the operator allocates a specific set of UE IDs (e.g., IMEI-SV) to multi-radio coexisted UEs. By detecting the specific UE ID, the serving eNB may refrain from handing over a UE with IDC capability to cells in ISM or near-ISM bands when the UE stays in RRC_CONNECTED state. On the other hand, when the UE goes to RRC_IDLE state from RRC_CONNECTED state, the eNB may prioritize non-ISM bands via RRCConnectionRelease message with redirection parameters. Identifying IDC capability by UE ID is a core network (CN)-centric solution, and is a backward compatible solution for LTE Rel-8/9 eNBs and UEs. It is also transparent to UEs.

In a second method, the UE intentionally performs cell selection or reselection to cells in non-ISM frequency bands. In RRC_IDLE state, the UE tries to select or reselect to cells in non-ISM frequencies by intentionally de-prioritizing the ISM frequencies. In RRC_CONNECTED state, the UE first switches to RRC_IDLE state, and then tries to perform the cell selection or reselection. De-prioritizing ISM frequencies for cell selection or reselection is a UE-centric solution. It is only relevant to UE internal operation and the network is unaware of the ISM operation in the UE. Since this is a UE-oriented cell selection/reselection, this solution could be applied to LTE Rel-8/9 eNBs/UEs.

In a third method, the UE signals the existence of ISM band applications via capability negotiation (i.e., static reporting). In a first embodiment, a new parameter for indicating the existence of the ID device is added in UE capability message. The first embodiment is not backward compatible because a new ASN.1 code-point is needed to support the new parameter. In a second embodiment, the UE capability message includes the supported frequency bands of the UE, and the existence of the ID device is implicitly indicated by the changing of the supported frequency bands (e.g., via a track area update (TAU) procedure). The second embodiment is backward compatible and can be applied in LTE Rel-8/9.

In a fourth method, the UE signals the activation of ISM band applications by signaling messages, such as RRC message or MAC control element (CE). In general, the UE can update the activation/deactivation of its ID device (i.e., semi-static reporting) or report the measurement results of the frequencies that may be affected by the ID device (i.e., dynamic reporting). More specifically, the UE can report IDC information represented in the form of RRC massage or MAC CE, and the carried information of the signaling message can be measurements based on eNB configuration including additional measurement report for ISM radios. Based on the reported information, the eNB can handover UE to cells in the non-ISM frequencies (FDM solution) or schedule LTE transmission in time domain with care (TDM solution).

In one advantageous aspect, when the serving eNB handovers the UE to a target eNB over a non-ISM frequency band to mitigate IDC interference, the target eNB refrains from handing over the UE back to ISM frequency band to avoid ping-pong effect. A first type of eNB-centric solution (e.g., information forwarding from the source eNB to the target eNB via X2 interface) and a second type of UE-centric solution (e.g., indicating IDC failure error cause) are provided to avoid ping-pong effect.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 10 illustrates one embodiment of UE-centric solution for avoiding ping-pong effect.

DETAILED DESCRIPTION

Reference will now be made in detail to some embodiments of the invention, examples of which are illustrated in the accompanying drawings.

Figure 1:
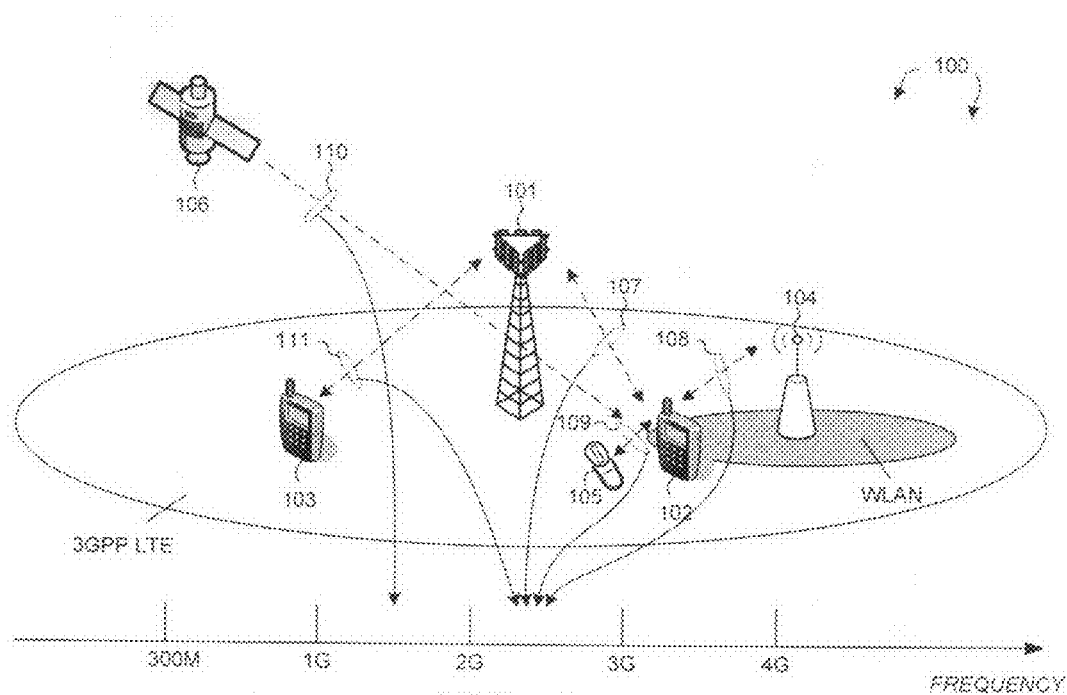
FIG. 1 illustrates a user equipment (UE) having coexisting radio devices in a wireless communication system in accordance with one novel aspect.

FIG. 1 illustrates a user equipment (UE) having coexisting radio devices in a wireless communication system 100 in accordance with one novel aspect. Wireless communication system 100 comprises a serving base station (e.g., evolved node-B) eNB 101, a first user equipment UE 102, a second user equipment UE 103, a WiFi access point WiFi AP 104, a Bluetooth device BT 105, and a global positioning system satellite device GPS 106. Wireless communication system 100 provides various network access services for UE 102 and UE 103 via different radio access technologies. For example, eNB 101 provides OFDMA-based cellular radio network (e.g., a 3GPP Long-Term Evolution (LTE) or LTE-Advanced (LTE-A) system) access, WiFi AP 104 provides local coverage in Wireless Local Area Network (WLAN) access, BT 105 provides short-range personal network communication, and GPS 106 provides global access as part of a Global Navigation Satellite System (GNSS). To better facilitate the various radio access technologies, UE 102 is a multi-radio terminal (MRT) that is equipped with multiple radios coexisted/co-located in the same device platform (i.e., in-device). On the other hand, UE 103 is only equipped with an LTE radio transceiver for LTE communications.

Due to spectrum regulation, different radio access technologies may operate in overlapping or adjacent radio spectrums. As illustrated in FIG. 1, UE 102 communicates radio signal 107 with eNB101, radio signal 108 with WiFi AP104, radio signal 109 with BT105, and receives radio signal 110 from GPS106. Radio signal 107 belongs to 3GPP Band 40, radio signal 108 belongs to one of the fourteen WiFi channels, and radio signal 109 belongs to one of the seventy-nine Bluetooth channels. The frequencies of all those radio signals fall within a range from 2.3 GHz to 2.5 GHz, which may result in significant in-device coexistence (IDC) interference. The problem is more severe around the 2.4 GHz ISM (The Industrial, Scientific and Medical) radio frequency band (e.g., ranges from 2400-2483.5 MHz), which is used by both the WiFi channels and the Bluetooth channels. On the other hand, UE103 communicates radio signal 111 with eNB101 and does not suffer any in-device coexistence interference.

Because UE102 and UE103 encounter different IDC interference, it is thus desirable for the network to be able to distinguish UEs with IDC capability from UEs without IDC capability. In one novel aspect, the network operator allocates a specific set of UE identifies (IDs) (e.g., International Mobile Equipment Identity-Software Version (IMEI-SV)) to multi-radio coexisted UEs. In the example of FIG. 1, UE 102 is allocated with a UE ID belongs to the specific set of UE IDs, while UE 103 is allocated with a UE ID does not belong to the specific set of UE IDs. Based on the UE ID, for radio resource management (RRM) operations, eNB 101 refrains from handing over UE 102 to cells in the ISM bands or near the ISM bands when UE 102 stays in RRC_CONNECTED state.

On the other hand, when UE 102 goes to RRC_IDLE state, eNB 101 prioritizes non-ISM bands via RRCConnectionRelease message with redirection parameters. Identifying IDC capability by UE ID is a CN-centric solution, and is a backward compatible solution that is transparent to UEs. However, some spectrum frequencies may be under-utilized. For example, UE 102 may not turn on its WiFi or BT radio transceiver all the time.

For UEs with IDC capability (e.g., LTE radio device coexisted with in-device ISM applications), there are three operation scenarios. A first scenario is that the LTE UE is conducting voice communication and no in-device ISM application is running. A second scenario is that the LTE UE is conducting voice communication and the in-device ISM application is also running. A third scenario is that the LTE UE is idle and the in-device ISM application is running. Meanwhile, the UE periodically listens to downlink paging channel. Based on the principles of frequency division multiplexing (FDM) and time division multiplexing (TDM), different UE-centric and eNB-centric solutions are proposed to mitigate IDC interference under different operation scenarios.

In LTE systems, two radio resource control (RRC) states namely RRC_IDLE and RRC_CONNECTED are defined. In the RRC_IDLE state, a UE can receive broadcast or multicast data, monitors a paging channel to detect incoming calls, performs neighbor cell measurements for cell selection or reselection, and acquires system-broadcasting information. Mobility is controlled by the UE in the RRC_IDLE state. In the RRC_CONNECTED state, the transfer of unicast data to/from UE, and the transfer of broadcast/multicast data to UE can take place. The UE monitors control channels associated with the shared data channel to determine scheduled data, provides channel quality feedback information, performs neighbor cell measurements and measurement reporting, and acquires system-broadcasting information. Unlike the RRC_IDLE state, mobility and handovers in the RRC_CONNECTED state are network-controlled and assisted by the UE.

Figure 2:
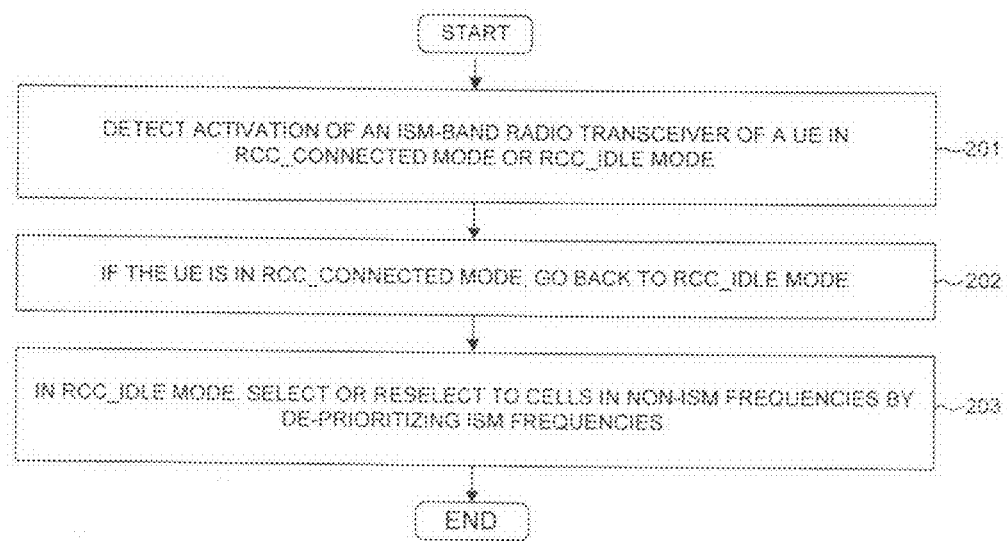
FIG. 2 is a flow chart of a method of performing cell selection/reselection in RRC_IDLE state in accordance with one novel aspect.

For UE-centric solution, a UE with IDC capability may perform cell selection or reselection to cells in non-ISM frequencies to mitigate IDC interference without network assistance. FIG. 2 is a flow chart of a method of performing cell selection or reselection in RRC_IDLE state in accordance with one novel aspect. In general, a UE equipped with both an LTE radio and a coexisting ISM-band radio is able to detect the activation of the ISM-band radio (step 201). If the UE is in RRC_CONNECTED state, then the UE goes back to RRC_IDLE state in step 202. In RRC_IDLE state, the UE tries to select or reselect to cells in non-ISM frequencies by intentionally de-prioritizing the ISM frequencies (step 203). De-prioritizing ISM frequencies for cell selection or reselection is a UE-centric solution. It is only relevant to UE internal operation and the network is unaware of the ISM operation in UE. Because there is no standard impact, this solution could be applied to LTE Rel-8/9 UEs. However, there could be some transmission interruption to the on-going LTE communications when the UE switches from RRC_CONNECTED state to RRC_IDLE state.

On the other hand, for LTE network-controlled UE-assisted solutions, the UE can send an indication to the network to report the coexistence problems. In one example, the UE indicates the network that coexistence problem may become serious on the serving frequency due to increase of ISM traffic. In another example, the UE indicates the network that certain of non-serving frequencies are experiencing serious coexistence problems (no serious coexistence problems on the serving frequency). In yet another example, the UE indicates the network that coexistence problems may become serious on the non-serving frequencies (no serious coexistence problems on the serving frequency). More specifically, a UE with IDC capability may signal its IDC capability to its serving eNB (static reporting). The UE may also report the activation or deactivation of its coexisting ISM applications to the serving eNB (semi-static reporting). Furthermore, the UE may report measurement results to the serving eNB (dynamic reporting). Based on the reported information, the eNB may make certain handover or scheduling decisions to mitigate IDC interference based on FDM or TDM solutions.

Figure 3:
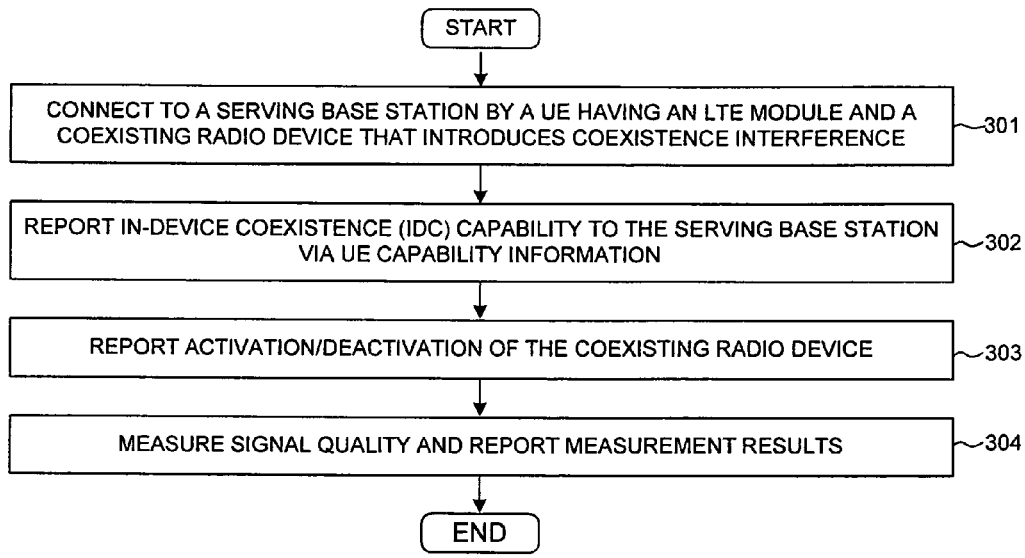
FIG. 3 is a flow chart of a method of signaling in-device coexistence (IDC) from UE perspective in accordance with one novel aspect.

FIG. 3 is a flow chart of a method of signaling in-device coexistence (IDC) from UE perspective in accordance with one novel aspect. In step 301, a UE establishes RRC connection with a serving eNB. The UE has an LTE radio module and a coexisting radio device (e.g., an ID device) that may introduce interference to the LTE module. For example, the ID device may be a WiFi radio or a BT radio that operates in ISM frequencies. In step 302, the UE signals the existence of its ID device via a UE capability message. The UE may report its capability information to the serving eNB directly, or report to a mobility management entity (MME) during registration procedure. Later on, the UE signals the activation of ISM band application on the ID device to the eNB (step 303). Finally, the UE measures signal quality (e.g., RSRP/RSRQ of the serving cell) and reports measurement results to the eNB (step 304). The measurement results may also include signal quality of frequency bands used by the coexisting radio device.

Figure 4:
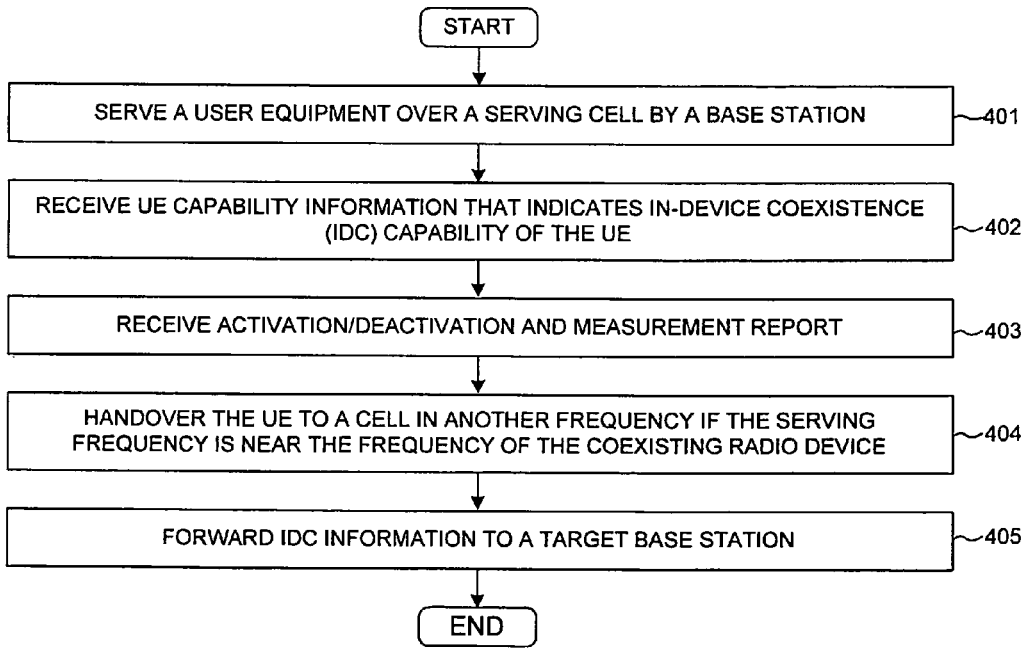
FIG. 4 is a flow chart of a method of signaling in-device coexistence (IDC) from eNB perspective in accordance with one novel aspect.

FIG. 4 is a flow chart of a method of signaling in-device coexistence (IDC) from eNB perspective in accordance with one novel aspect. In step 401, an eNB provides communication services to a UE over a serving cell. In step 402, the eNB receives UE capability information indicating IDC capability of the UE. In step 403, the eNB receives an activation indication of a coexisting radio device of the UE. The eNB may also receive measurement report of the serving cell as well as reports of frequency bands used by the coexisting radio device. Based on the received information, the eNB handovers the UE to a cell in another frequency if the serving frequency is near the frequency of the coexisting radio device (step 404). Finally, in step 405, the serving eNB forwards IDC information to a target eNB to prevent ping-pong effect. Various embodiments and examples of signaling IDC information and thereby mitigating IDC interference are now described below with more details and accompanying drawings.

Figure 5:
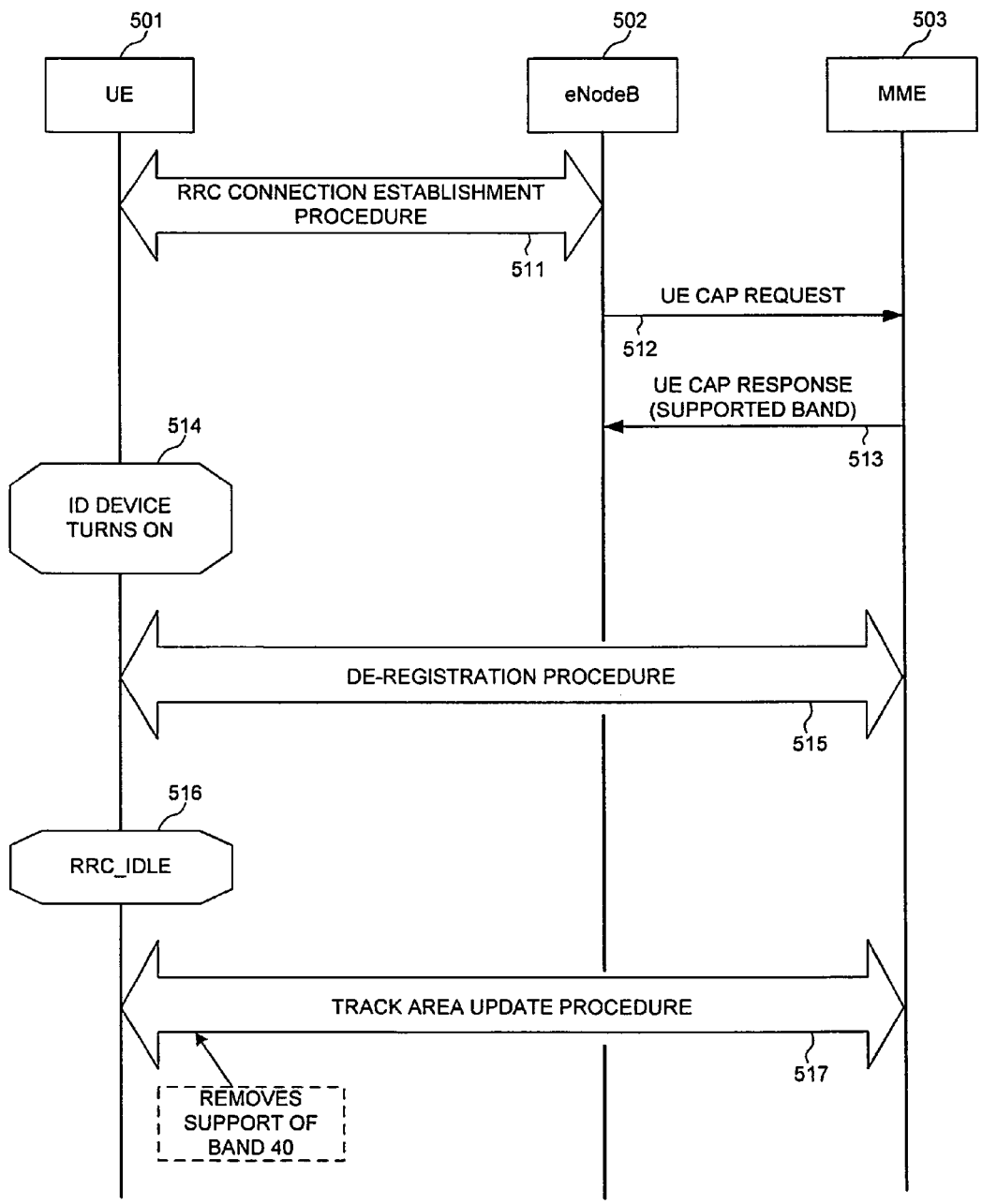
FIG. 5 illustrates a method of statically signaling in-device coexistence (IDC) via capability negotiation.

FIG. 5 illustrates a method of signaling in-device coexistence (IDC) via capability negotiation in a wireless communication system 500. Wireless communication system 500 comprises a UE501, an eNB502, and a MME503. In step 511, UE501 and its serving eNB502 performs RRC connection establishment procedure (e.g., UE501 in RRC_CONNECTED STATE). In step 512, eNB502 transmits a UE capability request to MME503. In response, MME503 transmits a UE capability response to eNB502 in step 513. MME503 obtains UE capability information from an earlier registration procedure. UE501 is a UE having an LTE radio module and an ID device that can introduce IDC interference to the LTE module. In a first embodiment, a new parameter for indicating the ID device is added in UE capability information. Whenever UE501 attaches to the network, the existence of the ID device is indicated via the UE capability information. This embodiment is not backward compatible because a new ASN.1 code-point is needed to support the new parameter.

In a second embodiment, the UE capability information includes the frequency bands supported by UE501, and the existence of the ID device is implicitly indicated by the change of supported frequency bands. For example, the UE supported frequency bands originally include Band 40 (e.g., 2300-2400 MHz) for LTE TDD mode. In step 514, UE501 turns on its ID device, which operates in ISM frequency band. To mitigate IDC interference, UE501 performs de-registration procedure with MME503 in step 515. After de-registration, UE501 goes back to RRC_IDLE state in step 516. UE501 then registers with the system again and initiates a track area update (TAU) procedure with MME503 in step 517. During the TAU procedure, UE501 updates its capability to MMS503 indicating that Band 40 is no longer supported by UE501. By removing Band 40 from the supported frequency bands, UE501 implicitly signals the MME and eNB the existence of ISM band application on UE501. This embodiment is backward compatible and can be applied in Rel-8/9 LTE UE/eNB. However, it is kind of a dynamic indication and the TAU procedure involves MME operation.

In addition to capability negotiation, a UE can also signal the activation of its ISM band application by radio resource control (RRC) layer messaging or media access control (MAC) layer control element (CE). In general, the UE can update the activation/deactivation of its ID devices (semi-static reporting) or report the measurement results of the frequencies that may be affected by the ID devices (dynamic reporting). More specifically, the UE can report IDC information represented in the form of RRC massage or MAC CE, and the carried information can be measurements based on eNB configuration including additional measurement reports for ISM radios. Based on the reported information, the eNB can handover UE to cells in the non-ISM frequencies (FDM solution) or schedule LTE transmission in time domain with care (TDM solution). For example, UE judgment is taken as a baseline approach for the FDM solution and the UE will trigger IDC indication to its serving eNB and will indicate which frequencies are usable or unusable due to IDC interference.

Figure 6:
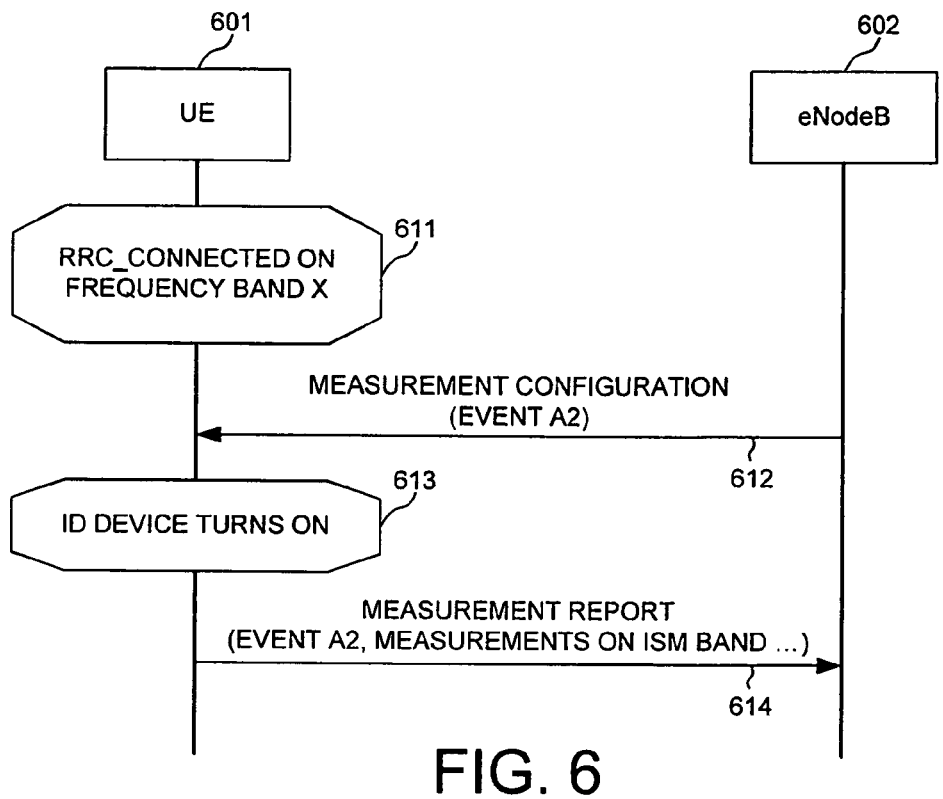
FIG. 6 illustrates a first embodiment of dynamically signaling IDC and ISM band application via measurement configuration of an existing event.

FIG. 6 illustrates a first embodiment of signaling IDC and ISM band application via measurement configuration of an existing event. In the example of FIG. 6, UE601 is in RRC_CONNECTED state and is served by eNB602 over a frequency band X (step 611). In step 612, UE601 receives measurement configuration (e.g., for an existing event A2 and extended for IDC) from eNB602. In step 613, UE601 turns on its ID device running ISM application. Based on the measurement configuration, UE601 measures signal quality of the serving cell (e.g., frequency band X) as well as signal quality of ISM frequency bands used by the ID device. In step 614, UE601 reports measurement results to eNB602. For example, the measurement report may be triggered by the configured measurement event A2. It should be noted that other measurement events other than A2 might also be applied as well, and the ISM frequency bands measurement results may be piggybacked onto normal measurement report.

Figure 7:
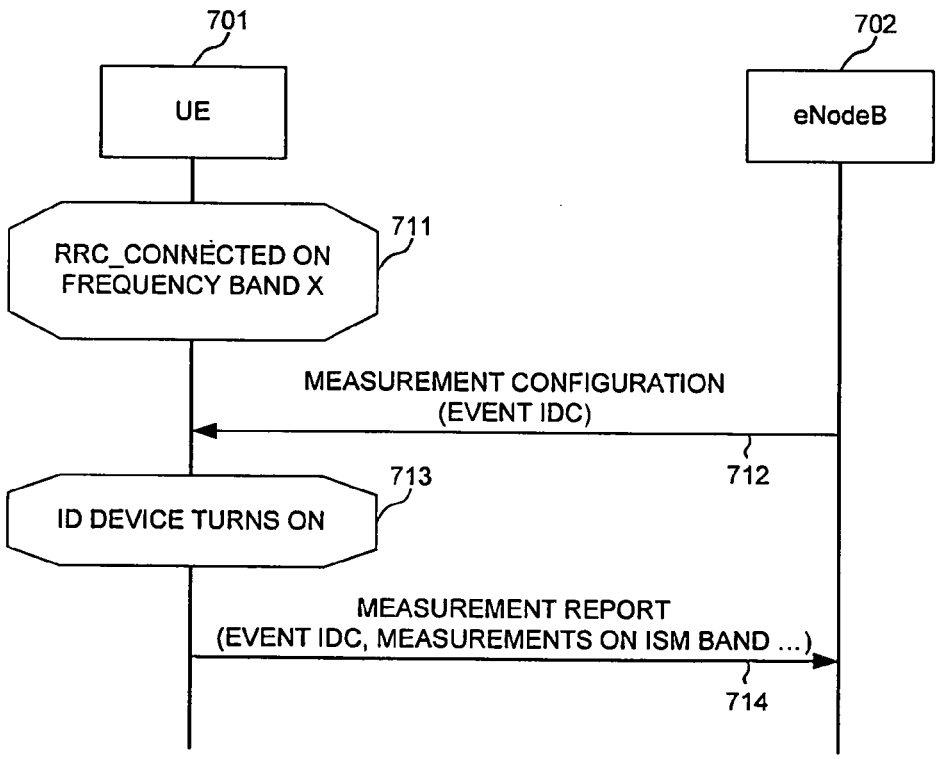
FIG. 7 illustrates a second embodiment of dynamically signaling ISM and application via measurement configuration of a new IDC event.

FIG. 7 illustrates a second embodiment of signaling ISM and application via measurement configuration of a new IDC event. In the example of FIG. 7, UE701 is in RRC_CONNECTED state and is served by eNB702 over a frequency band X (step 711). In step 712, UE701 receives measurement configuration (e.g., for a new event IDC) from eNB702. In step 713, UE701 turns on its ID device running ISM application. Based on the measurement configuration, UE701 measures signal quality of the serving cell (e.g., frequency band X) as well as signal quality of ISM frequency bands used by the ID device. In step 714, UE701 reports measurement results to eNB702. For example, the measurement report may be triggered by the configured measurement event IDC. It should be noted that this method could be applied in the scenario that LTE signal strongly interferes ID devices. In addition, UE701 measures the signal quality and reports the measurement results to serving eNB702 even if the signal quality of the serving cell is above an s-Measure threshold (e.g., the stop-measure mechanism is disabled). In another embodiment, an IDC threshold is defined to enable the measurement of the frequency bands used by ID devices.

Under the dynamic signaling method illustrated in FIGS. 6 and 7, if the interference situation changes significantly, the UE should send an indication to the network to report the updated interference situation. The triggering condition for sending the indications is configured by the eNB. This is a non-backward compatible solution because a new reporting procedure or modification to current measurement report which includes measurement configuration and report event are required. However, this method provides the most UE information so that the eNB can manage the UE with the most flexibility to achieve precise control and better spectral utilization.

Figure 8:
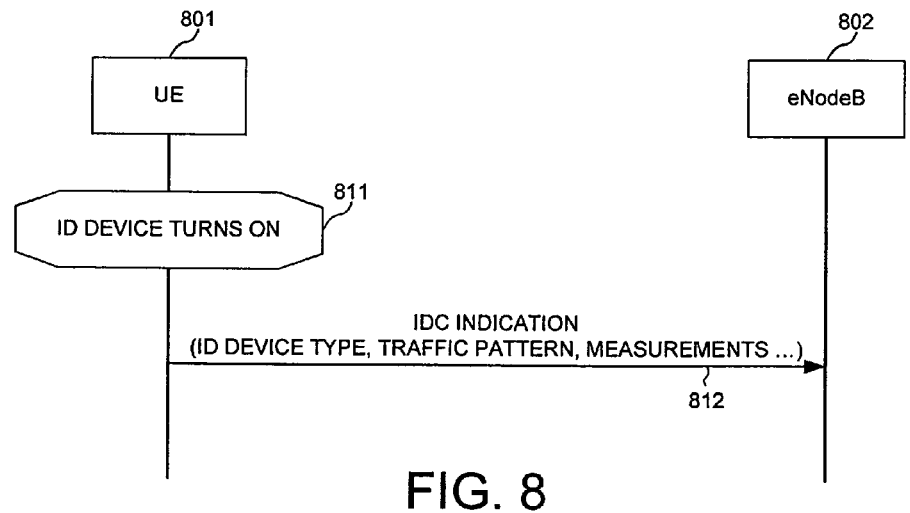
FIG. 8 illustrates a method of MAC CE-based IDC indication for semi-static reporting.

FIG. 8 illustrates a method of MAC CE-based IDC indication for semi-static reporting. In the example of FIG. 8, UE801 turns on its ID device running ISM application in step 811. In step 812, UE801 transmits IDC indication information to its serving eNB802. The IDC indication information includes ID device type, ID device traffic pattern, and optionally UE measurements on ISM bands (e.g., for dynamic reporting). In this semi-static reporting method, the eNB is informed whenever an in-device modem is enabled or disabled. A new reporting procedure is required (e.g., MAC CE or RRC). Because the eNB only knows limited IDC indication information, it may result in lower frequency utilization for the frequency band that may be interfered by the in-device modem as compared to the dynamic reporting method.

In one advantageous aspect, when a serving eNB handovers a UE to a target eNB over a non-ISM frequency band to mitigate IDC interference, the target eNB should refrain from handing over the UE back to ISM frequency band to avoid ping-pong effect. There are two types of solutions to avoid ping-pong effect. A first type of solution is eNB-centric solution (e.g., information forwarding among eNBs via X2 interface), and a second type of solution is UE-centric solution.

Figure 9:
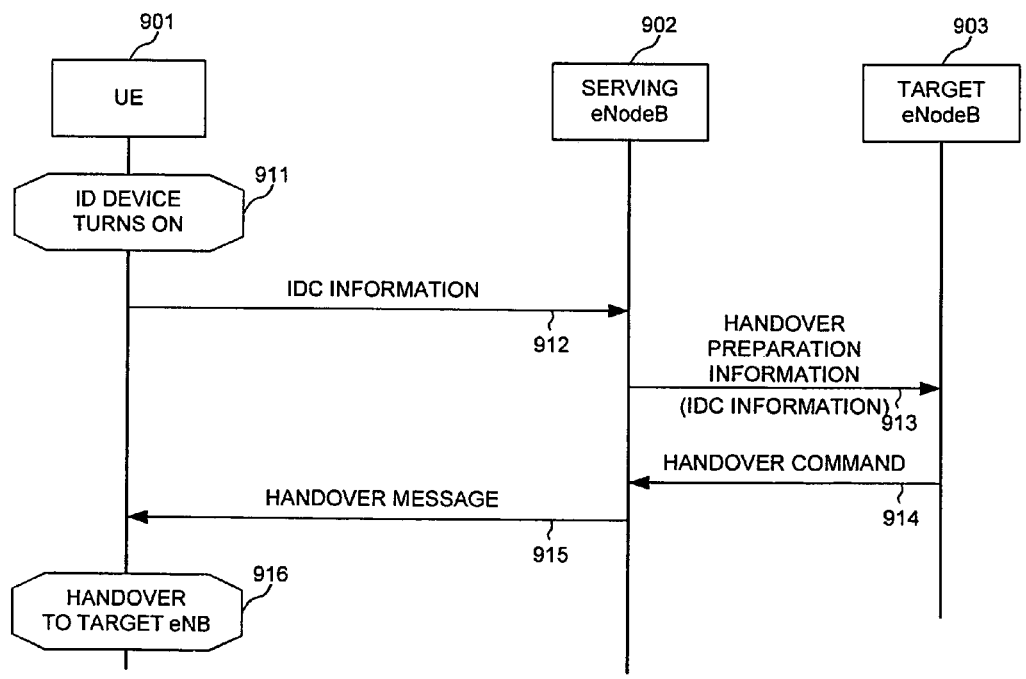
FIG. 9 illustrates one embodiment of eNB-centric solution for avoiding ping-pong effect.

FIG. 9 illustrates one embodiment of eNB-centric solution for avoiding ping-pong effect. In the example of FIG. 9, UE901 turns on its ID device running ISM application in step 911. In step 912, UE901 transmits IDC information to its serving eNB902. The IDC information may include UE capability information of its ID device type and ID device traffic pattern, UE measurement configuration, UE measurement results, and UE handover history information. In step 913, the source eNB902 initiates a handover procedure by sending a handover preparation information to the target eNB903. In addition, eNB902 forwards the IDC information to eNB903. In step 914, eNB903 transmits a handover command back to eNB902, which includes the RRC configurations from the target eNB903. In step 915, the source eNB902 transmits a handover message (e.g., RRCConnectionReconfiguration message in LTE/LTE-A system) to UE901. Upon receive the handover message, UE901 handovers from source eNB902 to target eNB903 in step 916. Because the target eNB903 has obtained IDC information, it will refrain from handover UE901 back to the source eNB902 if UE capability, measurement configuration, or measurement report indicates IDC interference.

FIG. 10 illustrates one embodiment of UE-centric solution for avoiding ping-pong effect. When a UE detects an occurrence of RLF on a serving cell, the UE first switches from RRC_CONNECTED state to RRC_IDLE state. The UE then performs cell reselection to select a new cell. When re-establishing RRC connection with the newly selected cell, the UE sends a reestablishment request with an error cause to indicate IDC interference. As illustrated in FIG. 10, an RRCConnectionReestablishmentRequest 1001 comprises a ReestablishmentCause 1002 that includes "IDC failure" error cause 1003. With this error cause, the UE will not be handover from the newly selected cell back to the original cell.

In one embodiment, the proposed dynamic reporting is coupled with filter mitigation mechanism (e.g., interference cancellation). When an ID device is activated, the UE first enables filter mitigation mechanism to alleviate the interference from the ID device. If the residual interference is still strong, then the UE reports IDC indication to its serving eNB.

Although the present invention has been described in connection with certain specific embodiments for instructional purposes, the present invention is not limited thereto. For example, although an LTE-advanced mobile communication system is exemplified to describe the present invention, the present invention can be similarly applied to other mobile communication systems. For example, the IDC interference comes from a phenomenon where multiple radio devices co-existing/co-locating in the same terminal interfere each other. The proposed reporting methods can be applied to other communication systems that are co-existed with in-device radios. Moreover, the phenomenon may occur in any frequency band employed by multiple radios. Frequency band of TV white space is one of the examples. The proposed reporting methods can be applied to resolve the IDC problem in those frequency bands. Accordingly, various modifications, adaptations, and combinations of various features of the described embodiments can be practiced without departing from the scope of the invention as set forth in the claims.

What is claimed is:

1. A method comprising:
   detecting an activation of an ISM-band radio transceiver of a user equipment (UE) in a wireless communication system, wherein the UE is equipped with the ISM-band radio transceiver and a coexisting OFDMA-based radio transceiver;
   switching to RRC_IDLE state if the UE is in RRC_CONNECTED state upon detecting the activation of the ISM-band radio transceiver; and
   selecting to a cell in non-ISM frequencies if the UE is in RRC_IDLE state, wherein the selecting is based on prioritizing the non-ISM frequencies for OFDMA-based communications.

2. The method of claim 1, further comprising:
   detecting an occurrence of radio link failure (RLF) and switching to RRC_IDLE state from RRC_CONNECTED state before the selecting; and
   re-establishing RRC connection with the newly selected cell with a reestablishment cause, wherein the reestablishment cause includes an error cause of in-device coexistence (IDC) interference.

3. A method comprising:
   connecting to a serving base station by a user equipment (UE) in a wireless communication system, wherein the UE is equipped with an OFDMA-based radio module and a coexisting radio device that introduces coexistence interference to the OFDMA-based radio module;
   performing a registration procedure with the system and thereby providing UE capability information containing supported bands;
   performing a deregistration procedure with the system upon detecting an activation of the coexisting radio device, wherein the UE performs tracking area update (TAU) to provide updated UE capability information; and
   reporting in-device coexistence (IDC) capability to the serving base station, wherein the existence of the coexisting radio device is indicated via the updated UE capability information containing updated supported bands.

4. The method of claim 3, wherein the UE capability information comprises a parameter indicating the coexisting radio device.

5. The method of claim 3, wherein the existence of the coexisting radio device is implicitly indicated by information of supported bands, wherein the frequency bands used by the coexisting radio device are excluded.

6. The method of claim 3, further comprising:
   detecting an activation/deactivation of the coexisting radio device;
   reporting the activation/deactivation of the coexisting radio device to the serving base station.

7. The method of claim 6, wherein the reporting is via a media access control (MAC) control element (CE) indication or a radio resource control (RRC) message.

8. The method of claim 3, further comprising:
   measuring signal quality and reporting measurement results to the serving base station, wherein the measurement report includes signal quality of frequency bands used by the coexisting radio device.

9. The method of claim 8, wherein the reporting is based on the measurement configuration of an event configured by the serving base station, and wherein the measurement results of the frequency bands used by the coexisting radio device are piggybacked onto normal measurement report.

10. The method of claim 8, wherein the measuring and reporting are based on measurement configuration of an IDC event configured by the serving base station.

11. The method of claim 8, wherein the measuring is performed when the signal quality of its serving cell is higher than an s-Measure threshold.

12. A method comprising:
   serving a user equipment (UE) over a serving cell by a serving base station in a wireless communication system;
   transmitting a UE capability request to the system;
   receiving UE capability information that indicates in-device coexistence (IDC) capability of the UE in response to the UE capability request, wherein the UE capability information contains supported bands;
   receiving tracking area update (TAU) for obtaining updated UE capability information when a coexisting radio device is activated, wherein the existence of the coexisting radio device is indicated by the updated UE capability information containing updated supported bands; and
   handing over the UE to a cell in another frequency that is away from the frequency of the serving cell if the serving frequency is near the frequency of the coexisting radio device.

13. The method of claim 12, wherein the serving base station receives a parameter in the UE capability information indicating the coexisting radio device.

14. The method of claim 12, wherein the serving base station receives information of supported bands, wherein the frequency bands of the coexisting radio device are excluded.

15. The method of claim 12, further comprising:
   receiving an indication of an activation/deactivation of the coexisting radio device.

16. The method of claim 15, wherein the indication is transmitted via a media access control (MAC) control element (CE) or a radio resource control (RRC) message.

17. The method of claim 12, further comprising:
receiving channel quality measurement results reported by the UE, wherein the measurement report includes signal quality of frequency bands used by the coexisting radio device.

18. The method of claim 17, wherein the serving base station configures the measurement of an event, and wherein the measurement results of the frequency bands used by the coexisting radio device are piggybacked onto the measurement report of the configured event.

19. The method of claim 17, wherein the serving base station configures the measurement of an IDC event.

20. The method of claim 12, further comprising:
forwarding IDC information to a target base station, wherein the IDC information comprises at least one of UE capability information, UE measurement configuration, UE measurement results, and UE handover history information.

* * * * *